US007467129B1

United States Patent
Bong

(10) Patent No.: US 7,467,129 B1
(45) Date of Patent: Dec. 16, 2008

(54) METHOD AND APPARATUS FOR LATENCY AND POWER EFFICIENT DATABASE SEARCHES

(75) Inventor: James A. Bong, Sunnyvale, CA (US)

(73) Assignee: Kawasaki Microelectronics, Inc., Chiba-shi (JP)

(*) Notice: Subject to any disclaimer, the term of this patent is extended or adjusted under 35 U.S.C. 154(b) by 392 days.

(21) Appl. No.: 10/325,887

(22) Filed: Dec. 23, 2002

Related U.S. Application Data

(60) Provisional application No. 60/408,304, filed on Sep. 6, 2002.

(51) Int. Cl.
*G06F 17/30* (2006.01)

(52) U.S. Cl. ............... 707/3; 707/101; 707/205; 707/10; 711/138

(58) Field of Classification Search ............ 707/1, 707/3, 6, 100, 101; 711/108, 170; 365/49; 370/392, 469
See application file for complete search history.

(56) References Cited

U.S. PATENT DOCUMENTS

| 5,870,733 | A   | * | 2/1999  | Bass et al. ............... 707/2 |
| 6,374,326 | B1  |   | 4/2002  | Kansal et al. ........... 711/108 |
| 6,473,846 | B1  | * | 10/2002 | Melchior ................ 711/108 |
| 6,862,281 | B1  | * | 3/2005  | Chandrasekaran ....... 370/392 |
| 2001/0049676 | A1 | * | 12/2001 | Kepler et al. ............ 707/3 |
| 2002/0023077 | A1 | * | 2/2002 | Nguyen et al. ........... 707/1 |
| 2002/0080665 | A1 |   | 6/2002 | Hata ..................... 365/200 |
| 2002/0107905 | A1 | * | 8/2002 | Roe et al. ............... 709/202 |
| 2003/0005120 | A1 | * | 1/2003 | Mutalik et al. .......... 709/225 |
| 2003/0142524 | A1 | * | 7/2003 | Shau ...................... 365/49 |
| 2004/0042490 | A1 | * | 3/2004 | Henderson et al. ....... 370/469 |
| 2005/0027702 | A1 | * | 2/2005 | Jensen et al. ............ 707/3 |

* cited by examiner

*Primary Examiner*—Cam Y T Truong
(74) *Attorney, Agent, or Firm*—Oliff & Berridge, PLC

(57) ABSTRACT

Methods, apparatus and systems perform searches in a CAM memory that is divided into one or more databases. A selector selects at least two the databases for a simultaneous search, and selects at least one of the databases for a sequential search.

24 Claims, 9 Drawing Sheets

US 7,467,129 B1

METHOD AND APPARATUS FOR LATENCY AND POWER EFFICIENT DATABASE SEARCHES

This nonprovisional application claims the benefit of U.S. Provisional Application No. 60/408,304, filed Sep. 6, 2002, which is incorporated herein by reference.

BACKGROUND OF THE INVENTION

1. Field of Invention

The present invention relates to database searches.

2. Description of Related Art

A content addressable memory (CAM) is a memory device that stores contents as entries such as addresses and/or data and the like, and have the ability to compare a given search data with its stored entries. If a match is found for the search data, one or more entries associated with the search data is returned. The returned one or more entries may be used directly in a performance of an operation or alternatively, the one or more entries may be used as basis for a "lookup" operation, for example.

CAM devices are widely used in many systems and in particular, in systems that process data such as computer systems, telecommunication systems, network systems and the like. For example, in a network router, an incoming packet header of a packet may be the search data that is used to lookup a destination address of the packet in a CAM device that the router uses to determine which port the packet is to be forwarded. Besides this basic function, a network router may search through the different databases, for example, to determine how the packet is to be processed and/or what filters are to be applied.

SUMMARY OF THE INVENTION

Through the introduction of higher density CAM devices and the ability to partition the CAM device's memory block into multiple sub-blocks, multiple databases can be stored in a single CAM device. However, there are many instances in which a single complete search data cannot be entered into the CAM device using a single clock cycle to search the multiple databases. Consequently, the complete search data is sent in several discrete portions using multiple clock cycles which increases the CAM's response time and power consumption.

The invention provides methods, apparatus and systems for performing searches in a CAM memory block that may be divided into multiple banks representing one or more databases and multiple clock cycles for complete search data entry. Each bank may be further divided into a plurality of segments; each segment may store a portion of or a complete content entry. Multiple memory banks, power management, storing partial results, and performing partial parallel searches may be utilized. In this way, the number of clock cycles may be reduced, thus lowering power consumption and increasing efficiency. Multiple databases may be searched in parallel using various portions of the complete search data, while other portions of the complete search data may be searched sequentially.

Match line results may be determined and stored for the segments of the banks. A match line result is a result of a comparison of a portion of the search data with a segment. The match line results may be retained and accumulated between searches of the banks. A portion of the complete search data may be sent to selected banks, and the search results may be combined with the search results of the previous search to give search results for the segments previously searched and the segments currently searched. The search result for the databases may be determined through accumulating match line results for searched segments. A search output memory may store a complete search result of a bank.

The databases may have different number of banks and/or search data entry widths. Portions of the complete search data may be altered in the CAM device for the databases. Even though the same portion of the search data may be provided to each bank, the bits that are irrelevant to the respective banks may be masked out in the CAM device. The search data portions not of interest to a particular database may not be provided to the database by deselecting the database from the search pathway in a search sequence.

Each bank and segment may be powered down when not in use. To save on power consumption, the CAM device may activate only those banks and segments that are of interest in any particular search. The segments that do not need to be searched may be deactivated to save power. Likewise, banks that are not the target of a search may be set to be inactive to conserve power. Careful use of selecting and deselecting banks can be used to efficiently reduce clock cycles while maximizing the use of the CAM device.

To further reduce the number of clock cycles required for a search, databases having fewer segments than other databases may be placed with higher priority in a CAM and appear earlier in a search sequence. Their results may be taken during parallel searches and thus sequential searches for such databases may not be necessary.

These and other features and advantages of the invention are described in, or are apparent from, the following description of various exemplary embodiments of the methods, apparatus and systems of the invention.

BRIEF DESCRIPTION OF THE DRAWINGS

Various exemplary embodiments of the invention are described in detail with reference to the following figures wherein.

DETAILED DESCRIPTION OF EXEMPLARY EMBODIMENTS

Figure 1:
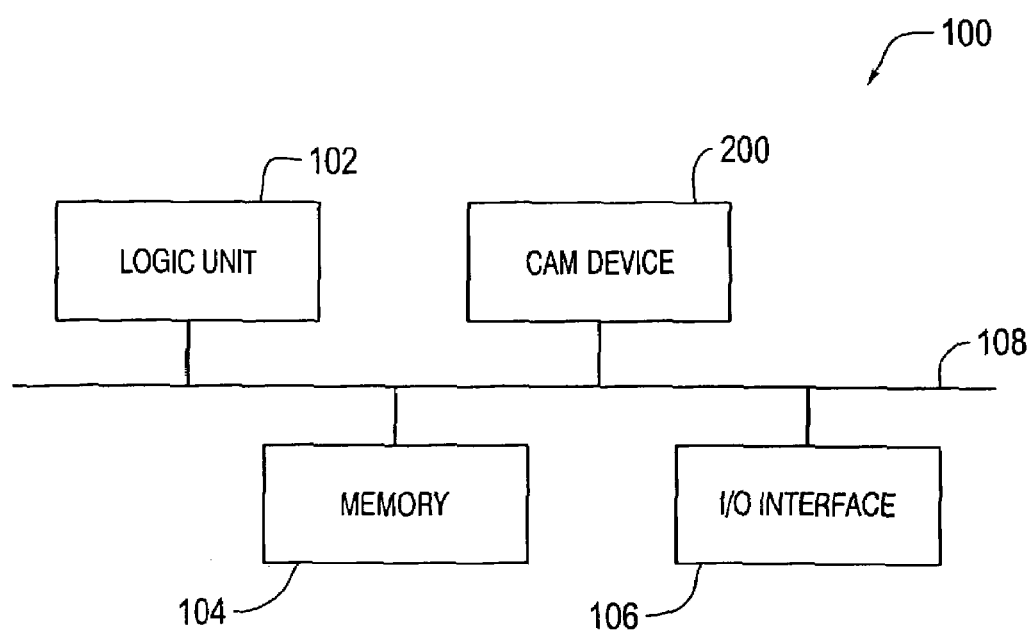
FIG. 1 shows a functional block diagram of an exemplary data processing system according to this invention.

FIG. 1 shows a functional block diagram of an exemplary data processing system 100 which includes a logic unit 102, a memory 104, an input/output interface 106 and a content addressable memory (CAM) device 200 interconnected by one or more control and/or data busses and/or application programming interfaces 108. In general, the data processing system 100 may represent any known or later-developed data processing system, such as a computer system, a telecommunication system, a network system and the like.

The logic unit 102, using a known protocol, may select the CAM device 200 for communication using the one or more control and/or data busses and/or application programming interfaces 108. Once communication is established, the logic unit 102 may cause the CAM device 200 to receive a complete or portions of a complete search data. The CAM device 200 searches stored entries for corresponding matches with the complete or portions of the complete search data. In the case where a complete search data is received, the CAM device 200 may return one or more search results as output to the logic unit 102.

When a portion of the complete search data is received, the CAM device 200 may retain a partial search result associated with the portion of the complete search data. The CAM device 200 then receives a next portion of the complete search data and performs a corresponding partial search. In this way, the CAM device 200 may continuously perform search operations for corresponding matches and retain the partial search results on consecutively received portions of the complete search data until all the portions of the complete search data are received. Then, the CAM device 200 returns one or more search results as output to the logic unit 102 based on the accumulated partial search results of all the received portions. Further details of the CAM device 200 is now described below.

Figure 2:
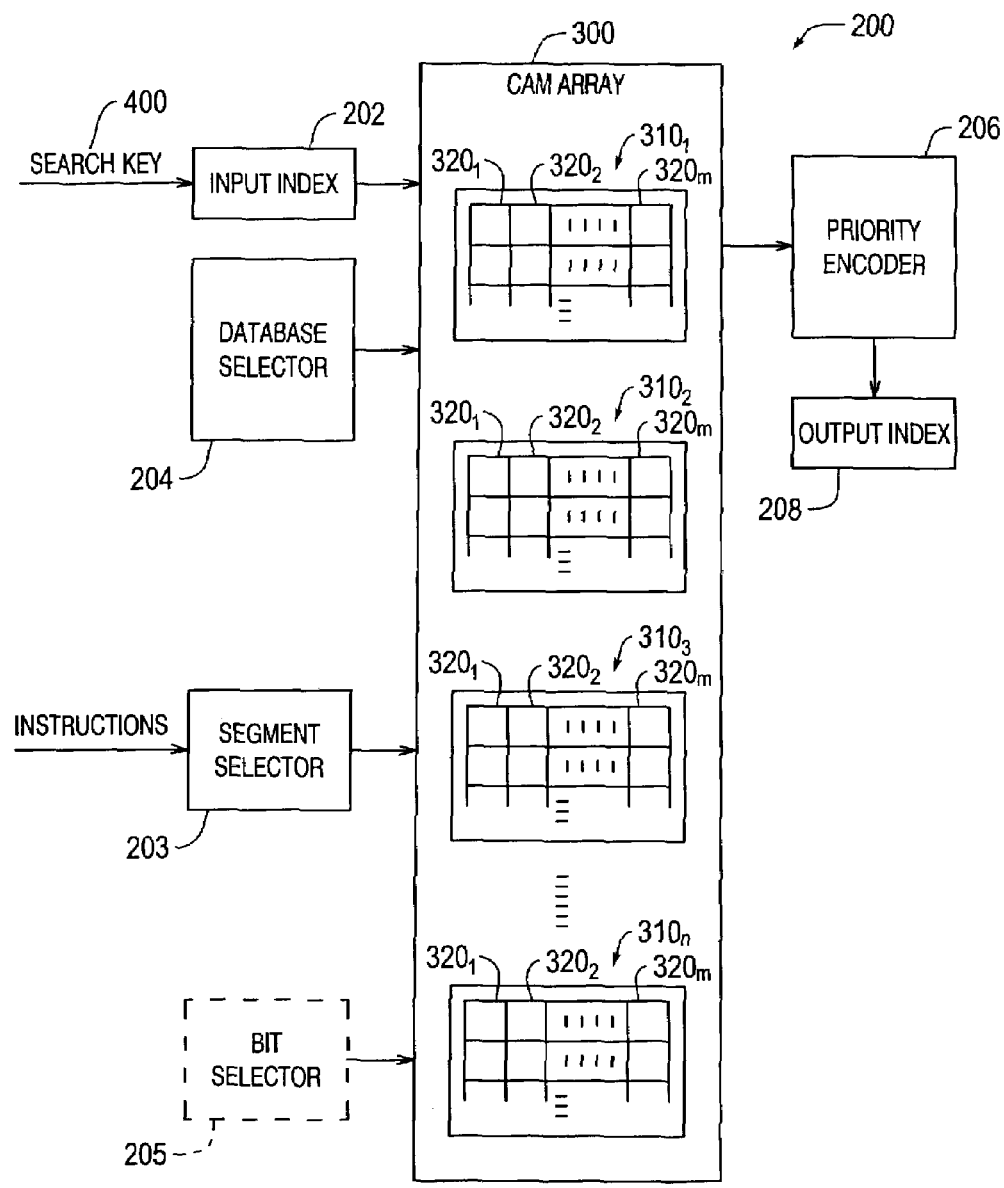
FIG. 2 shows a functional block diagram of an exemplary content addressable memory (CAM) device according to this invention.

FIG. 2 shows a functional block diagram of an exemplary CAM device 200 which includes an input index 202, a segment selector 203, a database selector 204, a bit selector 205, a CAM array 300, a priority encoder 206 and an output index 208. The input index 202 may be, for example, a register that holds a received complete or portion of a complete search data 400, which may be used to search the CAM array 300. The CAM array 300 may include one or more databases, each database represented by one or more physical banks $310_1 \ldots 310_n$. The entries in each bank $310_1 \ldots 310_n$ may be represented by a plurality of segments $320_1 \ldots 320_m$ in the bank $310_1 \ldots 310_n$, and each of the segments $320_1 \ldots 320_m$ may contain content or a portion of the content such as address and/or data.

A search of the CAM array 300 may require more than one clock cycle because the complete search data may not be entered as a single input entry to the CAM device 300, for various reasons. For example, the input data lines of the CAM device 300 may not accommodate the complete search data, and only portions of the search data are sent over the data lines for each clock cycle. In another example, the complete search data may be sent a portion at a time by a sending device due to a limitation of the sending device. In any event, multiple clock cycles may be used to send the complete search data, one portion at a time to the CAM device 300. Thus, if the complete search data is 288 bits wide and the input data lines are 72 bits wide, then 4 clock cycles may be required to send the complete search data to the CAM device 300.

In view of the above, a portion of a complete search data 400 that is equal to a number of bits of a segment $320_1 \ldots 320_m$ of the CAM array bank $310_1 \ldots 310_n$ may be transferred in each clock cycle. For example, if the segments $320_1 \ldots 320_m$ are 72 bits wide, then the complete search data may be divided into discrete portions that are 72 bits wide each. Thus, when a portion of the search data 400 having a width of a segment $320_1 \ldots 320_m$ is provided at every clock cycle, the segments $320_1 \ldots 320_m$ in a bank $310_1 \ldots 310_n$ can be searched during that clock cycle. It should be appreciated that the search may be executed sequentially or simultaneously on one or more banks $310_1 \ldots 310_n$ representing a single database or the search may be executed sequentially or simultaneously on one or more banks $310_1 \ldots 310_n$ representing a plurality of databases. It should also be appreciated that the portion of the search data 400 need not be limited to a width of a segment but the portion of the search data 400 may be for two or more segments, or fractions thereof. Details of the database searches will be further described with respect to FIG. 3.

The segment selector 203, based on instruction signals received from, for example, the logic unit 102 (see FIG. 1) or a finite state machine, may select which segments are to be searched among the plurality of segments $320_1 \ldots 320_m$ in the banks $310_1 \ldots 310_n$. For example, the segment selector 203 may select the segments $320_1$ of the banks $310_1 \ldots 310_n$ to be searched by a portion of a complete search data 400 received by the CAM device 200.

After the complete search data has been received by the CAM array 300 and the databases have been searched, and if there are more than one entry in the CAM array 300 that matches with the complete search data, the priority encoder 206, based on a priority scheme, selects from the multiple matched entries. The selected entry may then be retained in the output index 208, which may also be a register. The retained entry in the output index 208 may be used directly in a performance of an operation or the entry may be used as an index to another device.

Figure 3:
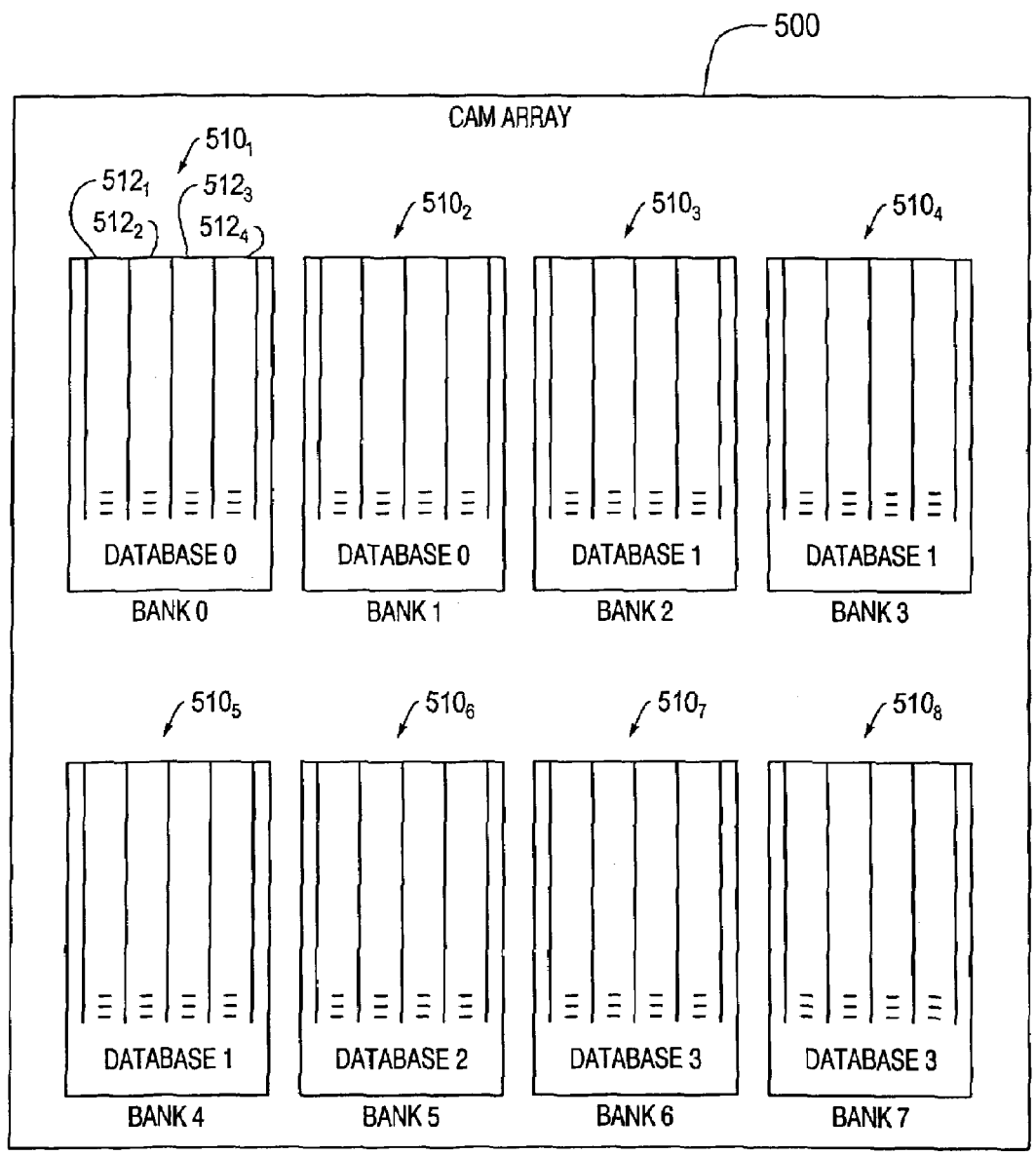
FIG. 3 shows one functional block diagram of an exemplary CAM array according to this invention.

FIG. 3 shows one functional block diagram of an exemplary CAM array 500 which includes eight banks $510_1 \ldots 510_8$ representing four databases 0, 1, 2 and 3. Databases 0 and 3 may have two banks $510_1$ and $510_2$, and $510_7$ and $510_8$; database 1 may include three banks 5103, 5104 and 5105; and database 2 may include a single bank 5106. Each bank $510_1 \ldots 510_8$ contains entries that are 288 bits wide which are stored in four segments $512_1 \ldots 512_4$. Each segment $512_1 \ldots 512_4$ is 72 bits wide and the search data bus is 72 bits wide.

When multiple clock cycles are required to provide the complete search data, the CAM device 500 may perform parallel searches on all desired databases 0, 1, 2, and 3 for all search data portions except for the last portion. As each bank $510_1 \ldots 510_8$ is searched, match flag registers store the results for the searched segments $512_1 \ldots 512_4$ of the banks $510_1 \ldots 510_8$. AND-chains accumulate the match flag results of all previously searched segments $512_1 \ldots 512_4$ with the most recently searched segments $512_1 \ldots 512_4$. The match flag registers and the AND-chains will be further described with respect to FIGS. 7 and 8.

For example, the CAM device 500 may require 4 clock cycles of 72 bit portions of the complete data to receive a complete search data during a typical search. Thus, for the first 3 clock cycles, parallel searches may be performed on all banks $510_1 \ldots 510_8$ of all desired databases 0, 1, 2 and 3. Specifically, in the first clock cycle, the CAM device 500 receives the first portion of the complete data and performs searches in the first segments $512_1$ of each bank $510_1 \ldots 510_8$ for matching entries. If there is a match with one or more first segments $512_1$ of the banks $510_1 \ldots 510_8$, match flag registers associated with the first segments $512_1$ store the matched result. Next, the CAM device 500 receives the second portion of the complete data and performs searches on the second segments $512_2$ of each bank $510_1 \ldots 510_8$ for matching entries. If there is a match with one or more second segments $512_2$ of the banks $510_1 \ldots 510_8$, match flag registers associated with the second segments $512_2$ store the matched result. Next, the CAM device 500 receives the third portion of the complete data and performs searches on the third segments $512_3$ of each bank $510_1 \ldots 510_8$ for matching entries. If there is a match with one or more third segments $512_3$ of the banks $510_1 \ldots 510_8$, match flag registers associated with the third segments $512_3$ store the matched result.

For the fourth and last portion of the complete search data, however, the databases 0, 1, 2 and 3 may be searched individually and serially. Thus, for each database 0, 1, 2 and 3 of interest, the last search may be repeated until all databases 0, 1, 2 and 3 of interest are searched. The last portion of the complete search data for this last sequence of searches may be retrieved from a register or alternatively, may be provided repetitively from a sending device. It should be appreciated that if the last portion of the search data is repetitively sent from a sending device, then the last portion of the search data may be the same or may be different. It should be further appreciated that not all searches are limited to parallel searches except for the last segment. For example, the searches performed on the last two segments might be solely directly to a single database. In another example, the second segment may be used to search the databases 0, 1, 2 and 3 individually and serially. Accordingly, it should be appreciated that different combinations and possibilities exist with searching databases in parallel or individually on a per segment basis.

The database selector 204 (see FIG. 2) selects the banks to be searched. The data selector 204 may operate based on instruction signals received from, for example, the logic unit 102 (see FIG. 1). Alternatively, the data selector 204 may operate based on an internal control mechanism such as a finite state machine. An operation of an exemplary database selector in a form of a finite state machine 600 is now described using FIG. 4.

Figure 4:
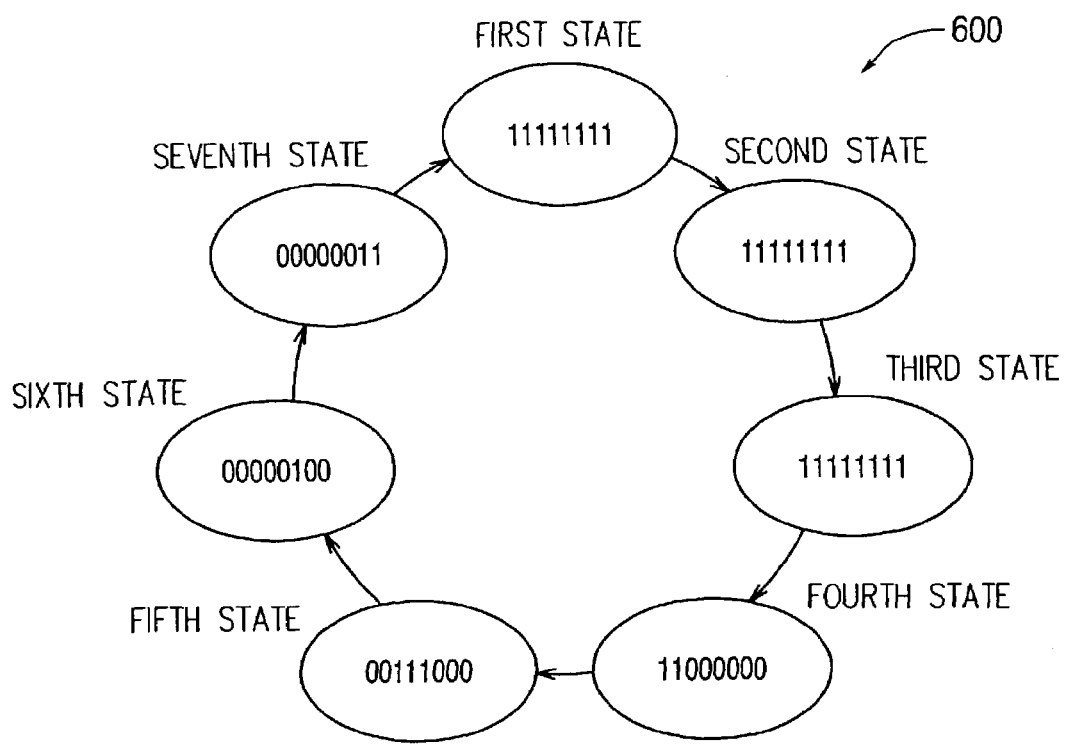
FIG. 4 is a state diagram of an exemplary finite state machine that is used to perform database searches in the exemplary CAM array of FIG. 3 according to this invention.

FIG. 4 shows a state diagram of an exemplary finite state machine 600 that may operate on the exemplary CAM array 500 of FIG. 3, and is provided for illustration purposes and should not be construed as limiting. The finite state machine 600 may be a logic circuit having eight outputs represented by eight bits to enable eight banks, and seven states to complete a search sequence in the CAM array. As an example, the first bit may be associated with the first bank, the second bit may be associated with the second bank, the third bit may be associated with the third bank and so forth. When the content of a bit is "1", then that bit enables the corresponding bank to be searched. An operation of the finite state machine is now described.

The operation of the exemplary finite state machine 600 starts with the first clock cycle, where the first portion of the complete search data is sent to the CAM device 500. During this time, the finite state machine 600 is at its first state 11111111 enabling all eight banks $510_1 \ldots 510_8$ for a search. Next, in the second clock cycle, the second portion of the complete search data is sent to the CAM device 500. During this time, the finite state machine 600 is at its second state 11111111 enabling all eight banks $510_1 \ldots 510_8$ for a search. Then, in the third clock cycle, the third portion of the complete search data is sent to the CAM device 500. During this time, the finite machine 600 is at its third state 11111111 enabling all eight banks $510_1 \ldots 510_8$ for a search.

In the fourth clock cycle, the fourth and final portion of the complete search data is sent to the CAM device 500. The search based on the final portion of the complete search data is treated differently. Instead of searching databases 0, 1, 2 and 3 in parallel, a single database, for example, database 0 is targeted. When database 0 is targeted, the other remaining databases 1, 2 and 3 are inactive and are not involved in the search. The fourth portion of the complete search data may be stored in a register for future searches or alternatively, it may be repetitively sent to the CAM device 500 during future searches.

In the fourth clock cycle, the finite state machine 600 may be at its fourth state 11000000 enabling banks 0 and 1 representing database 0. Next, in the fifth clock cycle, the finite state machine 600 is at its fifth state 00111000 enabling banks 2, 3 and 4 representing database 1. Then, in the sixth clock cycle, the finite state machine 600 is at its sixth state 00000100 enabling only bank 5 representing database 2. Lastly, in the seventh clock cycle, the finite state machine 600 is at its seventh state 00000011 enabling banks 6 and 7 representing the database 3. This completes the search sequence and the finite state machine 600 returns to the first state for the next search sequence. It should be appreciated that although the generation of the data selector 204 has been described using the finite state machine 600, this operation can be implemented as control signals from the logic unit 102.

The sequential search in the final phase of the search sequence may be to complete a search or to select the database to search and to output the result for that database. With a CAM device that includes many banks, those banks not in the targeted database are left inactive to save power. The search on the final segment combines the match flag register from previous segments together with current result to produce a final result for the targeted database. Even though other databases are inactive, the match flag registers for previously searched segments in other databases continue to store their values. A search on the final segment is done for each database of interest. Each search returns the result for a single database.

Figure 5:
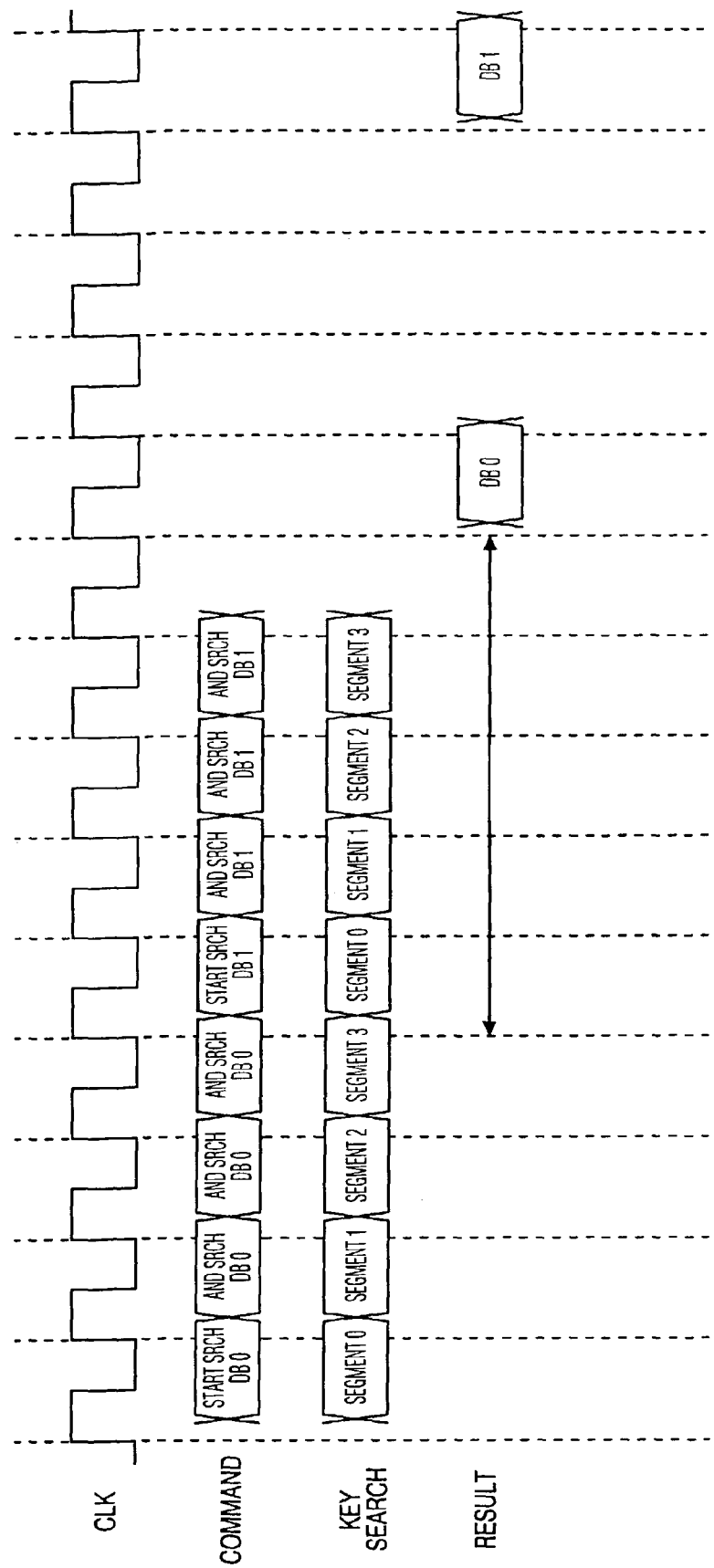
FIG. 5 shows a timing waveform of a search sequence performed sequentially per database on a CAM array.

FIG. 5 shows an exemplary timing waveform of a search sequence performed sequentially for Database 0 and Database 1. Each clock cycle provides 72 bits of search data starting with segment $512_1$ and ending with segment $512_4$ of the database banks. Thus, each database requires four clock cycles to complete a search. If the clock cycles per database are represented as n and the number of databases are represented as m, then the number of clock cycles for the complete search sequence is n*m, which in this instance is 4×4=16 clock cycles.

Figure 6:
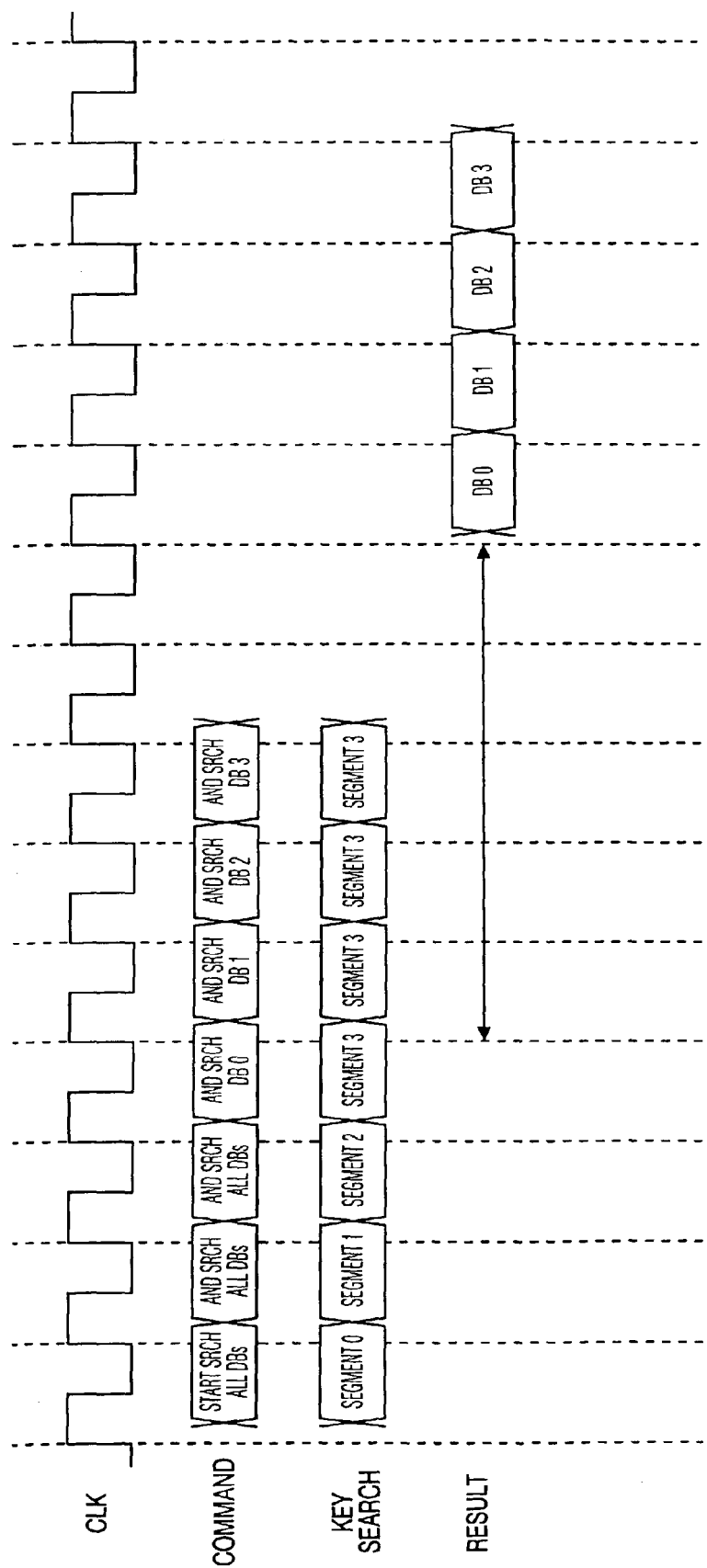
FIG. 6 shows a timing waveform of a search sequence according to this invention.

FIG. 6 shows an exemplary timing waveform where all four databases 0, 1, 2 and 3 are searched. The first three clock cycles are used to search all four databases 0, 1, 2 and 3 in parallel beginning with segment $512_1$ and ending with segment $512_3$. The next four searches each target a specific database. For instance, segment $512_4$ or the final segment is searched in Database 0, Database 1, Database 2, and Database 3 consecutively. Thus, if there are n segments in a database entry and m databases to search, the total number of clock cycles for the complete sequence is (n−1)+m, which in this instance is 3+4=7 clock cycles. Comparing the clock cycles of FIG. 5 and FIG. 6, it can be appreciated that the number of clock cycles in FIG. 5 to perform a search sequence is reduced by nine cycles with respect to the search sequence of FIG. 6, which also reduces power consumption.

Because the searches on the final segment may not be performed in parallel over multiple databases, the last portion of the complete search data may differ from one database to another. Some portions of the complete search data may not apply to all databases. In these instances, a bit selector 205 (see FIG. 2) may be used to mask out that portion or part of that portion as "don't care" bits. For example, mask registers specific to a database may be used to mask out the bits during a search. Other known techniques may be used to mask out the bits. For example, in ternary CAM devices, each entry in a database could specify those bits as "don't care". Bits to be masked may be varied using control signals from the logic unit 102 (see FIG. 2).

Figure 7:
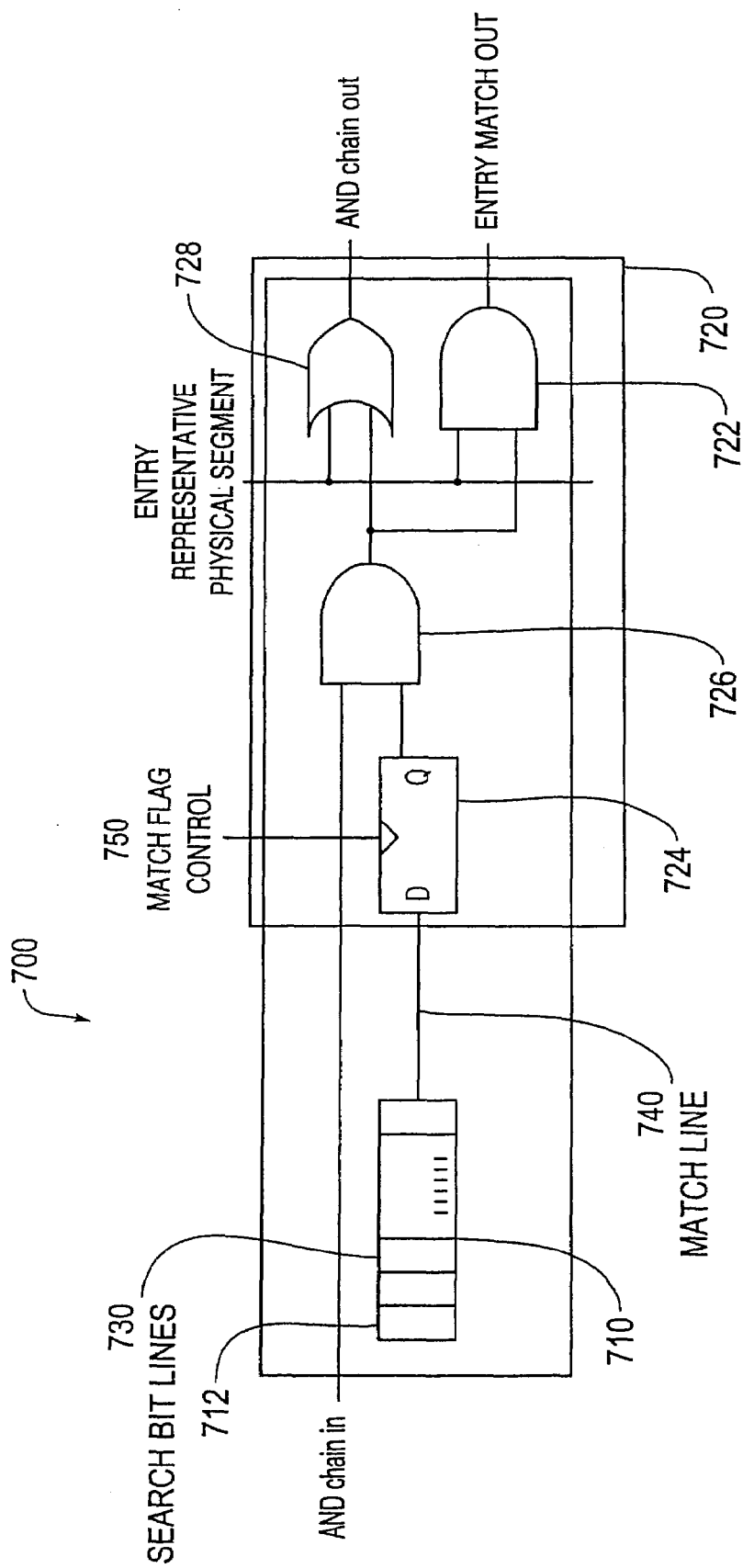
FIG. 7 shows a schematic diagram of an exemplary segment of a bank in a CAM array according to this invention.

FIG. 7 shows a schematic diagram of an exemplary segment 700 that includes a CAM word 710 and word logic 720. The CAM word 710 may include CAM cells 712 that stores content of m bits. The CAM word 710 receives search bit lines 730 and searches for a match between the stored content and the portion of the search data to output a match flag if there is a match via a match line 740. The word logic 720 includes a match flag register 724, an AND gate 726, an OR gate 728 and an AND gate 722. The match flag register 724 holds the match line 740 output from the CAM word 710. The AND gate 726 and the OR gate 728 are coupled together. The AND gate 722 serves as an entry match output for outputting a result of the entry match.

The match flag register 724 has the data input terminal D to which the match line 740 output from the CAM word 710 is input, and the data latch control terminal to which a match flag control signal 750 is input. Once the match flag register 724 receives the match flag control signal 750, it captures the match line 740 output.

The AND gate 726 constituting an AND chain has a first input terminal to which the output Q of the match flag register 724 is input, and a second input terminal to which the AND chain output of an adjacent word is input. Therefore, the AND gate 726 outputs a signal of logic '1' if the output from the match flag register 724 of this word indicates logic '1', or a match, and if the AND chain output from an adjacent word indicates logic '1', or a match.

The OR gate 728 which outputs an AND chain signal has a first input terminal to which the output of the AND gate 726 is input, and a second input terminal to which an entry representative segment instruction signal is input. The entry representative segment instruction signal signals the entry representative word which outputs a match signal for the entry if one entry is comprised of a combination of a plurality of words. The entry representative segment instruction signal indicates logic '1' if a segment is the entry representative word, and logic '0', otherwise.

If one entry is comprised of a combination of a plurality of words, the segment containing the word having the largest address for that entry may be output as a match address of the search result. However, it should be appreciated that the entry representative word can be the smallest address in an entry or an intermediate length of address in the entry.

The AND gate 722 functioning as an entry match output circuit has a first input terminal connected to the output of the AND gate 726, and a second input terminal connected to the entry representative physical segment instruction line. Thus, as the entry match output, an AND result of the match flags of the plurality of words in an entry is output from the AND gate 722 if that word is the entry representative word. Otherwise, or if not the entry representative word, logic '0' indicating a mismatch is output.

Figure 8:
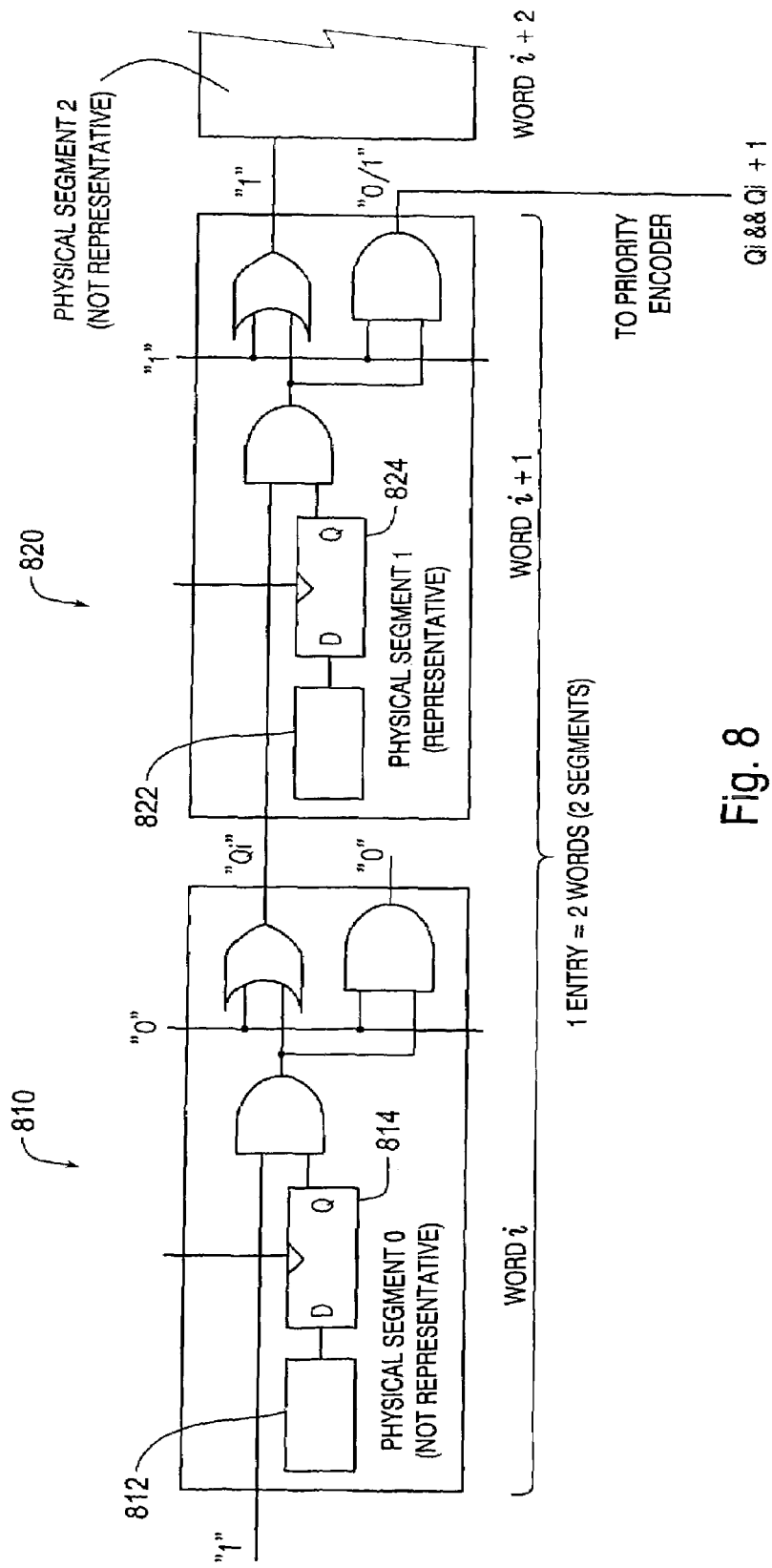
FIG. 8 is a schematic diagram of two exemplary segments in the case where one entry is composed of a combination of two words according to this invention.

FIG. 8 is a schematic diagram of two exemplary segments 810 and 820 in the case where one entry is comprised of a combination of two words. In this example, one entry is comprised of word i and word i+1, and the word i+1 is the entry representative word. That is, entry representative segment instruction signals which are input to the word i and the word i+1 are set to logic '0' and logic '1', respectively. Because word i−1 is the entry representative word of another entry, the AND chain input of the word i indicates logic '1', consequently, an AND chain is formed such that the word i and the word i+1 are logically coupled with each other. The match flag held in the match flag register 814 of the word i is propagated through the AND chain to the word i+1, and an AND result of the match flags of the word i and the word i+1 is output as the entry match output from the word i+1. A search process in the case where one entry is comprised of a combination of two words will now be described.

First, all the match flag registers are initialized. Thus, if the CAM cell is of the mismatch-detection type, because all the match lines of the CAM device not searched are maintained in the initial state or a match state, the match flag may be captured into the match flag register at the time of a first search. In the case of a first search, which is not reflected by the previous search result, the search bit lines in the segment to be searched are only driven, while the search bit lines of the segment not to be searched are maintained in a waiting state. Then, a match between the content stored in the CAM words 812 and 822 and the search data is searched for at the same time in the segment 810 and 820 to be searched, and a match flag is output to each corresponding match line. The match line outputs for the words belonging to a segment not to be searched are maintained in the initial state or a match state. Thereafter, in response to a data capture pulse applied to both match flag control signals at a timing of establishing the state of the match lines, a match line output is held in each corresponding match flag register 814 and 824.

Because the match flag registers 814 and 824 of the words belonging to a segment 810 and 820 not to be searched are maintained in the initial state or a match state, even if either segment 810 and 820 containing the word i or the word i+1 is to be searched for a first search, the search result can be correctly reflected to the entry match output for the entry representative word i+1. Accordingly, if one entry is composed of a combination of a plurality of words, a correct search result can be achieved if any word is first searched for a match.

In the case of an AND search, which is reflected by the previous search (first search in this embodiment) result, as in the first search, the search bit lines in a segment to be searched are only driven according to the search data. Thereafter, a data capture pulse is applied only to the match flag control signal of a word to be searched at a timing of establishing the state of the match lines, and a match line output is held in each corresponding match flag register 814 and 824.

In the case of an AND search, since the search result of the first search is held in the match flag register 814 and 824 of a word not to be searched, even if either segment containing the word i or the word i+1 is to be searched for an AND search, a correct AND search result for both can be output as the entry match output from the entry representative word i+1. Accordingly, the CAM device can achieve a match search in an arbitrary order.

The aforementioned AND search result is output as the entry match output from the entry representative word. Then, the addresses of the entry representative words are sequentially output from the priority encoder 206 (see FIG. 2) according to a predetermined priority.

As described above, a plurality of segments 810 and 820 are combined, and the search lines and the data capture into the match flag registers 814 and 824 are individually controlled, so that a correct AND search result can be obtained regardless of the searched order. In effect, the search bit lines and the match line of a word to be searched are only driven while the search bit lines and the match line of a word not to be searched are not driven, thereby greatly reducing power consumption.

Since the match flag register 814 and 824 of a word not to be searched is maintained in the initial state or a match state, for example, if one entry is comprised of a combination of four words, a match between the words of which the addresses are apart from each other in an entry can be searched, such as an AND search for a first word and a third word. This allows for a match search while distinguishing attributes of the data stored in each word, and a correct search result can be achieved. Further details may be found in the US Patent Application Publication No. 2002/0080665 which is incorporated, in its entirety herein by reference.

Figure 9:
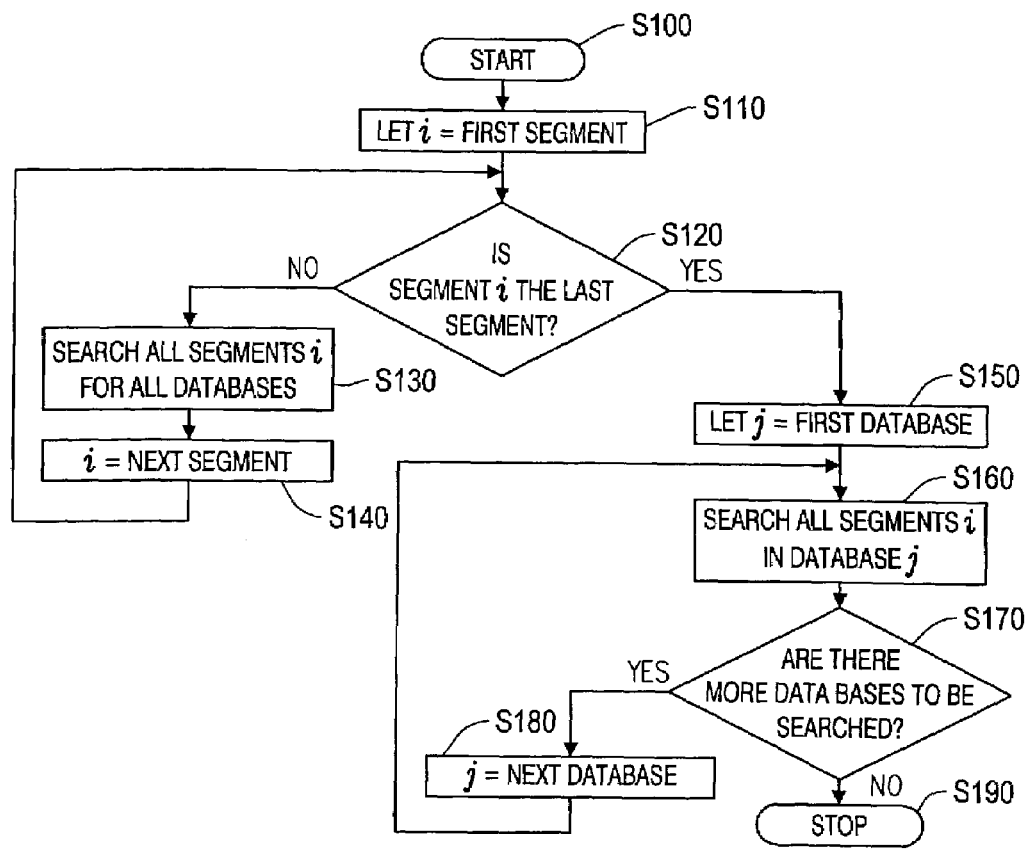
FIG. 9 is a flowchart outlining one exemplary embodiment of a method for performing CAM device database search according to this invention.

FIG. 9 is a flowchart outlining one exemplary embodiment of a method for performing CAM device database searches according to this invention. The operation starts at step S100 and continues to step S110, where segment i represents the first segment of the total number of segments that represent an entry in a bank of a CAM array. Then in step S120, a determination is made whether segment i is the last segment of the total number of segments. If not, then the operation continues to step S130 where segment i is searched for all databases of interest. Next, in step S140, segment i is defined as the next segment of the total number of segments that represent an entry. The operation then returns to step S120 to repeat the steps S130 and S140, if a determination is made that segment i is not the last segment.

Otherwise, if a determination is made that segment i is the last segment of the total number of segments that represent an entry, then the operation continues to step S150. In step S150, database j represents the first database. Next, in step S160, the last segment i is searched on the first database of interest. Next in step S170, a determination is made whether there are any other databases of interest to be searched. If there are other databases, then the operation continues to step S180. In step S180, the integer j is defined as the next database of interest and the operation returns to step S160 to repeat steps S160 and S170. Otherwise, if a determination is made that there are no other databases of interest, the operation continues to step S190 where the operation terminates.

The system 100 for performing CAM database searches may be implemented using a programmed general purpose computer. However, the system 100 can also be implemented using a special purpose computer, a network processor, a processor, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 9 can be used to implement an embodiment of the invention.

Each of the circuit, routine or applications 102, 104, 106 and 200 of the system 100 can be implemented as portions of a suitably programmed general purpose computer. Alternatively, circuit, routine or applications 102, 104, 106 and 200 of the system 100 outlined above can be implemented as physically distinct hardware circuits within an ASIC, or using a PLD, PLA, FPGA, or PAL, or using discrete logic elements or discrete circuit elements. The particular form each of the circuit, routine or applications 102, 104, 106 and 200 of the system 100 outlined above will take is a design choice and will be apparent to those skilled in the art.

Moreover, the system 100 and/or each of the various circuit, routine or applications discussed above can each be implemented as software routines, managers or objects executing on a programmed general purpose computer, a special purpose computer, a microprocessor or the like. In this case, the system 100 and/or each of the various circuit, routine or applications discussed above can each be implemented as one or more routines embedded in the communications network, as a resource residing on a server, or the like. The system 100 and the various circuit, routine or applications discussed above can also be implemented by physically incorporating the system 100 into a software and/or hardware system, such as the hardware and software systems of a document server, web server or electronic library server.

As shown in FIGS. 2 and 3, the CAM array can be implemented using any appropriate combination of alterable, volatile or non-volatile memory or non-alterable, or fixed, memory. The alterable memory, whether volatile or non-volatile, can be implemented using any one or more of static or dynamic RAM, flash memory or the like. Similarly, the non-alterable or fixed memory can be implemented using any one or more of ROM, PROM, EPROM, EEPROM or the like.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An apparatus that performs database searches within a content addressable memory (CAM) structure, comprising:
   a memory;
   a plurality of databases stored in the memory;
   a first selector that selects at least two databases of the plurality of the databases for a simultaneous search, and performs a sequential search within the CAM structure on at least one database of the selected at least two databases, wherein first portions of each database of the at least two databases are searched in parallel based on only a respective portion of a complete search data, and last portions of said each database of the at least two databases are searched individually and serially based on a remaining portion of the complete search data;
   one or more memory banks, said each database being stored in at least one memory bank;
   a plurality of segment groups in each memory bank corresponding to groups of database subcomponents, each segment group includes a plurality of segments; and
   an output section that outputs a search result that is based on the parallel and serial searches, wherein the complete search data for the parallel and serial searches of all of the at least two databases is provided in a number of clock cycles equal to (s−1)+m, wherein s equals a number of the segment groups within each memory bank of the memory banks, and m equals a total number of databases in the at least two databases.

2. The apparatus of claim 1, each database being divided into groups of database subcomponents, the apparatus further comprising:
   a second selector that selects a group of one or more database subcomponents from at least one of the databases selected by the first selector; and
   a third selector that selects a portion of database subcomponents selected by the second selector,
   wherein, portions of database subcomponents selected by the third selector in all of the at least two databases are searched during the parallel searching based on the respective portion of a complete search data provided in a single clock cycle.

3. The apparatus of claim 2, further comprising:
second selector information, the second selector selects the group of database subcomponents based on at least one of the input signal and the second selector information.

4. The apparatus of claim 3, wherein a first selector information and the second selector information are stored in a memory.

5. The apparatus of claim 4, wherein the first selector information and the second selector information are at least one of lookup table and state information.

6. The apparatus of claim 3, wherein the first selector and the second selector are finite state machines.

7. The apparatus of claim 2, further comprising:
third selector information, the third selector selects the portion of the database subcomponents based on at least one of an input signal and the third selector information.

8. The apparatus of claim 7, wherein the third selector information is masking information stored in a memory.

9. The apparatus of claim 7, wherein the third selector includes a register.

10. The apparatus of claim 2, wherein the third selector selects at least one of the portions of database subcomponents based on the results of a previous parallel search using one of the portions of the complete search data.

11. The apparatus of claim 1, further comprising:
a receiver that receives an input signal; and
first selector information, the first selector selecting the databases for at least one of simultaneous search and sequential search based on at least one of the input signal and the first selector information.

12. The apparatus of claim 1, wherein the apparatus powers down at least one of databases not selected by the first selector and groups of database subcomponents not selected by a second selector.

13. The apparatus of claim 1, wherein the complete search data for the parallel and serial searches of all of the at least two databases is provided in a number of clock cycles equal to (n−1)+m, wherein "n" equals a number of the portions of the complete search data, and "m" equals a total number of databases in the at least two databases.

14. An apparatus that performs database searches within a content addressable memory (CAM) structure, the searches based on a complete search data that is divided into a number of parts, the apparatus comprising:
a memory;
a plurality of databases stored in the memory, each database is divided into groups of database subcomponents;
a first selector that selects at least two databases of the plurality of the databases for a simultaneous search, and performs a sequential search within the CAM structure on at least one database of the selected at least two databases;
a second selector that selects a group of the database subcomponents from the at least one database of the databases selected by the first selector, wherein first portions of each database of the at least two databases are searched in parallel based on first parts of the complete search data and last portions of said each database of the at least two databases are searched individually and serially based on a remaining part of the complete search data;
one or more memory banks, said each database being stored in at least one memory bank;
a plurality of segment groups in each memory bank corresponding to groups of the database subcomponents, each segment group includes a plurality of segments; and
an output section that outputs a compiled result of the parallel and serial searches, wherein the complete search data for the parallel and serial searches of all of the at least two databases is provided in a number of clock cycles equal to (s−1)+m, wherein s equals a number of the segment groups within each memory bank of the memory banks, and m equals a total number of databases in the at least two databases.

15. An apparatus for performing database searches within a content addressable memory (CAM) structure comprising:
a memory;
a plurality of databases stored in the memory;
means for selecting at least two databases of the plurality of the databases for a simultaneous search;
means for performing a sequential search within the CAM structure on at least one database of the selected at least two databases, wherein first portions of each database of the at least two databases are searched in parallel based on a part of a complete search data, and last portions of said each database of the at least two databases are searched individually and serially based on a remainder of the complete search data, one or more memory banks, said each database being stored in at least one memory bank, a plurality of segment groups in each memory bank corresponding to groups of database subcomponents, each segment group includes a plurality of segments; and
an output section that outputs a search result based on the parallel and serial searches, wherein the complete search data for the parallel and serial searches of all of the at least two databases is provided in a number of clock cycles equal to (s−1)+m, wherein s equals a number of the segment groups within each memory bank of the memory banks, and m equals a total number of databases in the at least two databases.

16. A computer implemented method for performing database searches within a content addressable memory (CAM) structure, comprising:
storing a plurality of databases in a memory;
selecting at least two databases of the plurality of the databases for a simultaneous search;
performing a sequential search within the CAM structure on at least one database of the selected at least two databases, wherein first portions of each database of the at least two databases are searched in parallel based on only a respective portion of a complete search data, and last portions of said each database of the at least two databases are searched individually and serially based on a remaining portion of the complete search data, said each database being stored in at least one memory bank, a plurality of segment groups in each memory bank corresponding to groups of database subcomponents, and each segment group including a plurality of segments; and
outputting a search result based on an accumulation of the parallel and serial searches, wherein the complete search data for the simultaneous and serial searches of the at least two databases is provided in a number of clock cycles equal to (s−1)+m, wherein s equals a number of the segment groups within each memory bank of memory banks, and m equals a total number of databases in the at least two databases.

17. The method of claim 16, further comprising:
selecting the databases for one of simultaneous search and sequential search using at least one of an input signal and first selector information.

18. The method of claim 17, wherein each database is divided into groups of database subcomponents, the method further comprising:

selecting a group of database subcomponents from at least one of the databases selected for either simultaneous search or sequential search, wherein, portions of database subcomponents selected in all of the at least two databases are searched during the parallel searching based on the respective portion of the complete search data provided in a single clock cycle.

19. The method of claim 18, further comprising:

selecting the group of database subcomponents using at least one of the input signal and second selector information.

20. The method of claim 19, further comprising:

selecting portions of a search data that are relevant to a search in a database.

21. The method of claim 20, further comprising:

selecting the portions of the search data using at least one of the input signal and third selector information.

22. The method of claim 21, further comprising:

powering down at least one of databases that is not selected.

23. The method of claim 21, further comprising:

powering down a group of database subcomponents that is not selected.

24. An apparatus that performs database searches within content addressable memory (CAM) structures, comprising:

a memory;

a CAM structure of the CAM structures that is subdivided into multiple groups of portions to be searched in parallel or sequentially, the CAM structure comprising one or more memory banks;

a plurality of databases being stored on the CAM structure, each database being stored in at least one memory bank;

a first selector that selects at least two databases of the plurality of the databases for a simultaneous search, and performs a sequential search within the CAM structure on at least one database of the selected at least two databases, wherein first portions of each database of the at least two databases are searched in parallel based on only a respective portion of a complete search data, and last portions of said each database of the at least two databases are searched individually and serially based on a remaining portion of the complete search data; and an output section that outputs an accumulated search result based on the parallel and serial searches, wherein the complete search data for the parallel and serial searches is provided in a number of clock cycles equal to or less than $(s-1)+m$, wherein s equals a number of portions within each searched group of searched groups of the CAM structure, and m equals a total number of databases in the at least two databases.

* * * * *